(12) United States Patent
Ogura

(10) Patent No.: US 7,526,257 B2
(45) Date of Patent: Apr. 28, 2009

(54) MOBILE COMMUNICATION TERMINAL AND CELL SEARCH CIRCUIT

(75) Inventor: Miyuki Ogura, Tachikawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 377 days.

(21) Appl. No.: 10/793,215

(22) Filed: Mar. 5, 2004

(65) Prior Publication Data

US 2004/0259503 A1 Dec. 23, 2004

(30) Foreign Application Priority Data

Jun. 17, 2003 (JP) ............................. 2003-172000

(51) Int. Cl.
*H04B 1/44* (2006.01)
(52) U.S. Cl. ...................... 455/78; 455/67.11; 455/423
(58) Field of Classification Search ............. 455/67.11, 455/78, 423, 434, 437, 442, 515, 524, 525
See application file for complete search history.

(56) References Cited

U.S. PATENT DOCUMENTS

| | | | | |
|---|---|---|---|---|
| 6,259,916 B1 * | 7/2001 | Bourk et al. | ................ | 455/434 |
| 6,477,162 B1 * | 11/2002 | Bayley et al. | ............... | 370/342 |
| 6,507,740 B2 * | 1/2003 | Shi | ............................ | 455/437 |
| 6,697,622 B1 * | 2/2004 | Ishikawa et al. | ............ | 455/434 |
| 7,035,670 B2 * | 4/2006 | Kikuma | ...................... | 455/561 |
| 7,206,351 B2 * | 4/2007 | Okumura et al. | ............ | 375/262 |
| 2006/0121856 A1 * | 6/2006 | Itoh et al. | ..................... | 455/69 |

FOREIGN PATENT DOCUMENTS

| | | |
|---|---|---|
| JP | 2001-028778 | 1/2001 |
| JP | 2001-69063 | 3/2001 |
| JP | 2001-112046 | 4/2001 |
| JP | 2001-169339 | 6/2001 |
| JP | 2002-374226 | 12/2002 |

OTHER PUBLICATIONS

Notification of Reason for Rejection dated Mar. 17, 2005, from Japanese Patent Office in Japanese Patent Application No. 2003-172000.

* cited by examiner

*Primary Examiner*—Nay A Maung
*Assistant Examiner*—Tuan H Nguyen
(74) *Attorney, Agent, or Firm*—Finnegan, Henderson, Farabow, Garrett & Dunner, L.L.P.

(57) ABSTRACT

A mobile communication terminal includes a module configured to measure, at a first frequency, the reception quality of a radio signal transmitted from a base station serving the mobile communication terminal in a standby mode, a module configured to evaluate the measured reception quality, and a module configured to change the first frequency to a second frequency on the basis of the evaluation result of the reception quality.

10 Claims, 3 Drawing Sheets

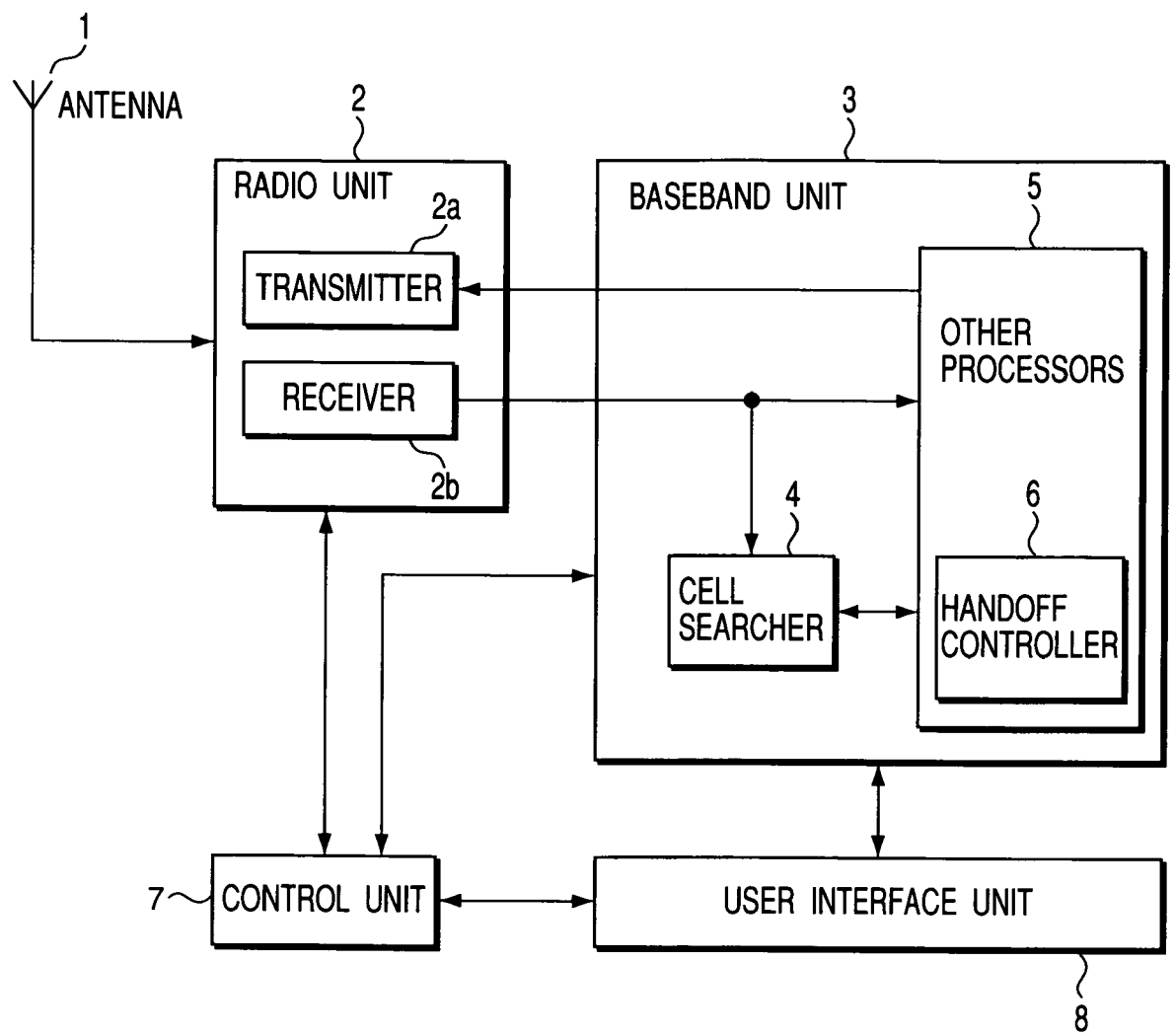
F I G. 1

MOBILE COMMUNICATION TERMINAL AND CELL SEARCH CIRCUIT

CROSS-REFERENCE TO RELATED APPLICATIONS

This application is based upon and claims the benefit of priority from prior Japanese Patent Application No. 2003-172000, filed Jun. 17, 2003, the entire contents of which are incorporated herein by reference.

BACKGROUND OF THE INVENTION

1. Field of the Invention

The present invention relates to a mobile communication terminal used in a cellular mobile communication network system and a cell search method for the mobile communication terminal.

2. Description of the Related Art

In a cellular mobile communication network system, a plurality of base stations are distributed in a service area. A radio zone called a cell is formed by each base station. Radio connection between a base station and a mobile communication terminal is executed in each cell. In a system of this type, when a mobile communication terminal is powered on, synchronization is established between the mobile communication terminal and the nearest base station. After establishment of synchronization, the mobile communication terminal is set in a standby state. When, in this standby state, the base station notifies the mobile communication terminal of an incoming call, or an operation for an outgoing call is executed by the mobile communication terminal, negotiation for establishing a communication link is executed between the base station and the mobile communication terminal. When the communication link is established, the mobile communication terminal is set in a communication state.

In the cellular mobile communication network system, handoff is performed as the mobile communication terminal moves from a cell to another. Handoff is processing for changing the base station as the synchronization establishment destination of the mobile communication terminal. Preparing for handoff, the mobile communication terminal in the standby state or communication state receives a pilot signal transmitted from a base station (to be referred to as an active base station hereinafter) for which synchronization is established and measures the reception level while receiving pilot signals transmitted from neighboring base stations located in the neighborhood and measures the reception levels. It is determined on the basis of the measurement result whether handoff is necessary. When it is determined that handoff is necessary, handoff processing is executed.

In this handoff control method, if the reception quality of a signal from a neighboring base station is higher than that of a signal from the active base station, handoff processing is executed even when the reception quality of the signal from the active base station is so high that no handoff is required. For this reason, unnecessary handoff frequently occurs depending on the transmission path environment around the mobile communication terminal. If both the signal reception quality from the active base station and those from the neighboring base stations are poor, and the difference between them is small, handoff is repeatedly executed. In addition, synchronization establishment fails more frequently due to errors in selecting the handoff destination. Under these circumstances, the power consumption of the mobile communication terminal increases. This shortens the service life of the battery.

Conventionally, processing for measuring the reception quality of a signal from each neighboring base station in accordance with the transmission path environment around a mobile communication terminal, i.e., a technique for increasing/decreasing the frequency of cell search for neighboring base stations has been proposed (Jpn. Pat. Appln. KOKAI Publication No. 2001-28778 (see pp. 1, 9, and 10 and FIG. 4)). According to this technique, when the transmission path environment around a mobile communication terminal is satisfactory, the number of times of cell search for neighboring base stations is small. Hence, the power consumption of the mobile communication terminal decreases.

However, although the number of times of cell search for the neighboring base stations is decreased, this technique has no regard for processing for measuring the reception quality of a signal from the active base station. Hence, the power consumption of the mobile communication terminal is still large.

BRIEF SUMMARY OF THE INVENTION

It is an object of the present invention to provide a mobile communication terminal and a cell search circuit therefor, which can reduce power consumption to make the battery service life longer by improving processing for measuring the reception quality of a radio signal transmitted from an active base station.

In order to achieve the above object, according to an aspect of the present invention, in a standby mode, the reception quality of a radio signal transmitted from a serving base station is measured at a first frequency, and the measured reception quality is evaluated. On the basis of the evaluation result of the reception quality, the first frequency is changed to a second frequency.

According to another aspect of the present invention, in a standby mode, the reception quality of a radio signal transmitted from a serving base station is measured. The measured reception quality is stored and evaluated. On the basis of the evaluation result of the reception quality, filtering processing is executed for the measured latest reception quality and the stored past reception quality. The reception qualities that have undergone the filtering processing are used for evaluation.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram showing the arrangement of a mobile communication terminal according to an embodiment of the present invention;

DETAILED DESCRIPTION OF THE INVENTION

FIRST EMBODIMENT

Figure 2:
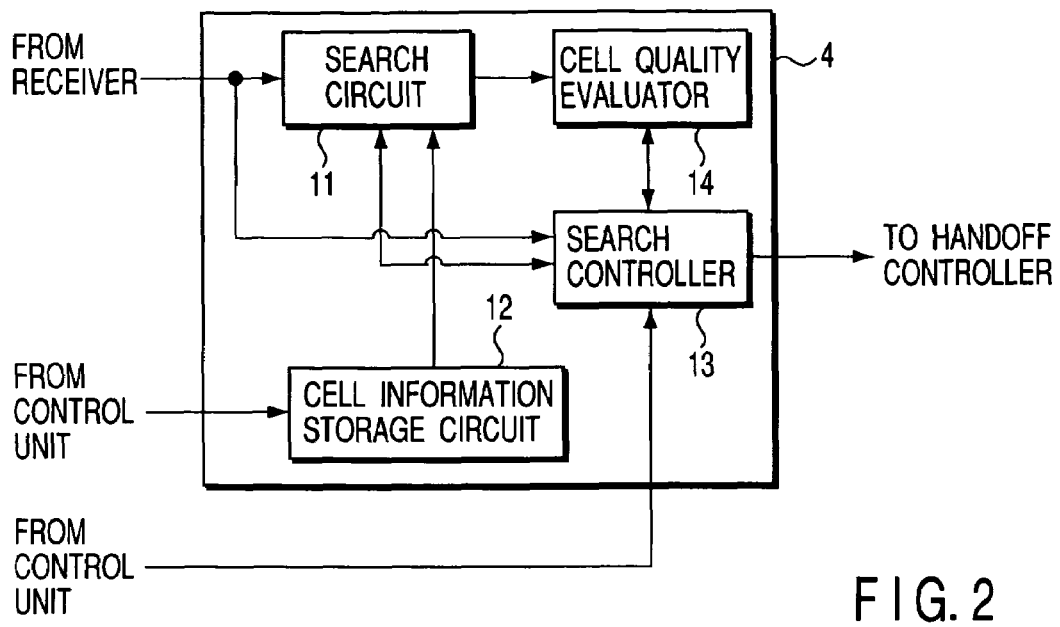
FIG. 2 is a block diagram showing the arrangement of the cell searcher of the mobile communication terminal shown in FIG. 1.

A cellular mobile communication network system according to the embodiment of the present invention employs CDMA (Code Division Multiple Access). A base station broadcasts a pilot signal. The pilot signal is spread in advance by using a predetermined spreading code. An initial phase offset value, which changes between base stations, is assigned to the spreading code. A mobile communication terminal establishes initial synchronization with a base station when powered on or going out of synchronization. At this time, the mobile communication terminal executes search for all of many and unspecified base stations by using a sliding correlator. After synchronization is established, preparing for handoff, the mobile communication terminal receives pilot signals transmitted from the active base station for which synchronization is established and a plurality of neighboring base stations that exist around the active base station, and measures the reception qualities. It is determined on the basis of the measured reception qualities whether handoff is necessary.

FIG. 1 is a block diagram showing the arrangement of a mobile communication terminal according to an embodiment of the present invention. This mobile communication terminal comprises an antenna 1, radio unit 2, baseband unit 3, control unit 7, and user interface unit 8.

The radio unit 2 has a transmitter 2a and a receiver 2b. The receiver 2b low-noise-amplifies a radio signal received by the antenna 1 and down-converts it into an intermediate frequency or baseband frequency. The converted reception signal is converted into a digital signal and then input to the baseband unit 3. The transmitter 2a up-converts a transmission signal output from the baseband unit 3 into a radio frequency and power-amplifies it. The amplified radio signal is transmitted from the antenna 1 to a base station.

The baseband unit 3 has a cell searcher 4 and other processor 5. The other processor 5 has a handoff controller 6. The other processor 5 also has a RAKE receiver, AFC/AGC controller, error-correcting encoder/decoder, and modulator. On the basis of the search frequency set by the cell searcher 4, the handoff controller 6 controls processing (to be referred to as active cell search hereinafter) for measuring the reception quality of the pilot signal transmitted from the active base station and processing (to be referred to as neighboring cell search hereinafter) for measuring the reception qualities of the pilot signals transmitted from the neighboring base stations. The cell quality evaluation result by the cell search is received from the cell searcher 4. It is determined on the basis of the received cell quality evaluation result whether handoff is necessary.

As shown in, e.g., FIG. 2, the cell searcher 4 comprises a search circuit 11, cell information storage circuit 12, search controller 13, and cell quality evaluator 14. The cell information storage circuit 12 stores the phase offset values of a spreading code (pseudo random code), which are assigned to the active base station and the plurality of neighboring base stations, in correspondence with pieces of base station identification information.

The search controller 13 designates, to the search circuit 11, the active base station and neighboring base stations to be searched for in accordance with designation information received from the handoff controller 6. The search circuit 11 reads out the spreading code from the cell information storage circuit 12. The initial phases of the readout spreading code are specified by the phase offset values corresponding to the designated active base station and neighboring base stations. The search circuit 11 despreads the reception signal output from the receiver 2b by using the readout spreading code. The reception power level of the received pilot signal that is reproduced by despreading is detected. The detected reception power level is output to the cell quality evaluator 14.

The search controller 13 decides, on the basis of the preceding quality evaluation result by the cell quality evaluator 14, quality evaluation parameters to be used in the next cell search. The quality evaluation parameters include the frequency of active cell search and a filter constant. The filter constant is formed from a register length and a weight coefficient. The decided quality evaluation parameters are given to the cell quality evaluator 14. In accordance with the quality evaluation parameters given by the search controller 13, the cell quality evaluator 14 evaluates the reception power level output from the search circuit 11. The evaluation result is given to the search controller 13 as a material to decide the quality evaluation parameters in the third cell search.

Figure 3:
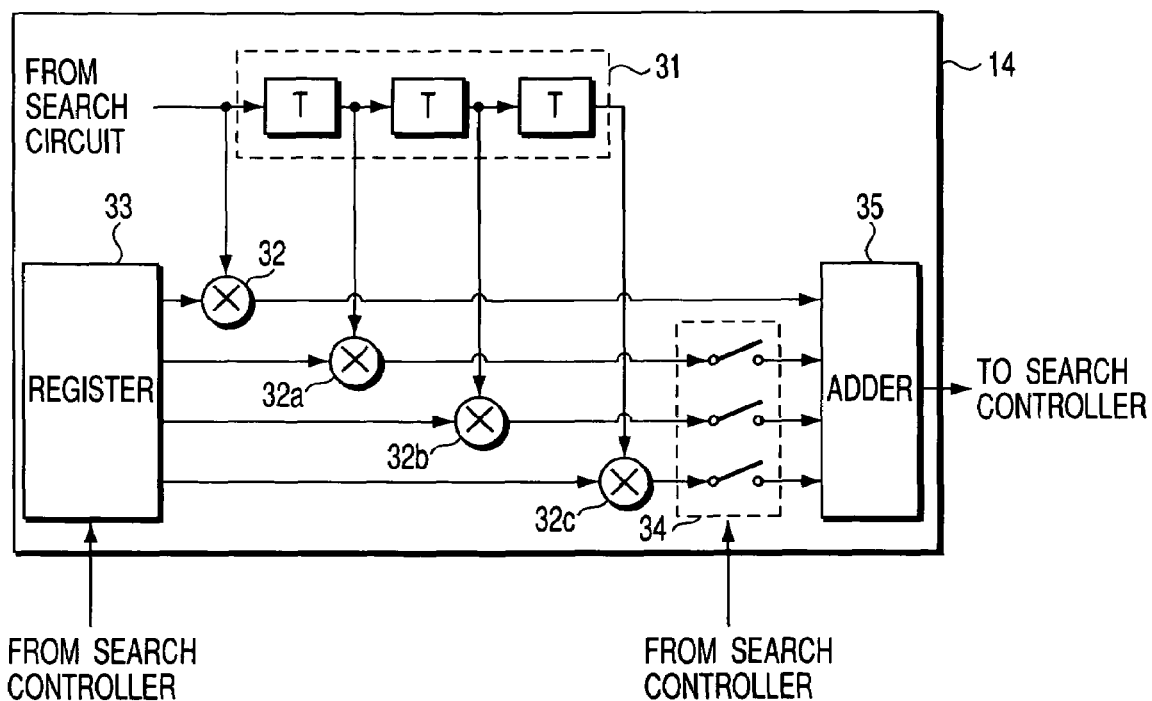
FIG. 3 is a block diagram showing the arrangement of the cell quality evaluator of the cell searcher shown in FIG. 2.

As shown in, e.g., FIG. 3, the cell quality evaluator 14 has a shift register 31, multipliers 32, 32a, 32b, and 32c, register 33, switch circuit 34, and adder 35. The shift register 31 is formed from three storage elements connected in series. The shift register 31 stores the reception power levels of the active cell in three cell search cycles, which are output from the search circuit 11. The register 33 reads out the weight coefficient specified by the filter constant given by the search controller 13 and gives the weight coefficient to the multipliers 32, 32a, 32b, and 32c.

The multipliers 32, 32a, 32b, and 32c multiply the reception power levels of the active cell in three cell search cycles, which are output from the shift register 31, by the weight coefficient read out from the register 33. The switch circuit 34 turns on a switch corresponding to the register length specified by the filter constant given by the search controller 13 to selectively supply the products output from the multipliers 32, 32a, 32b, and 32c to the adder 35. The adder 35 adds the supplied products and gives the sum to the search controller 13 as an evaluation result.

The control unit 7 has a CPU (Central Processing Unit) and a memory. The control unit 7 collectively controls the entire mobile communication terminal in accordance with a program installed in advance. The user interface unit 8 has an input device, display device, loudspeaker, and microphone.

Figure 4:
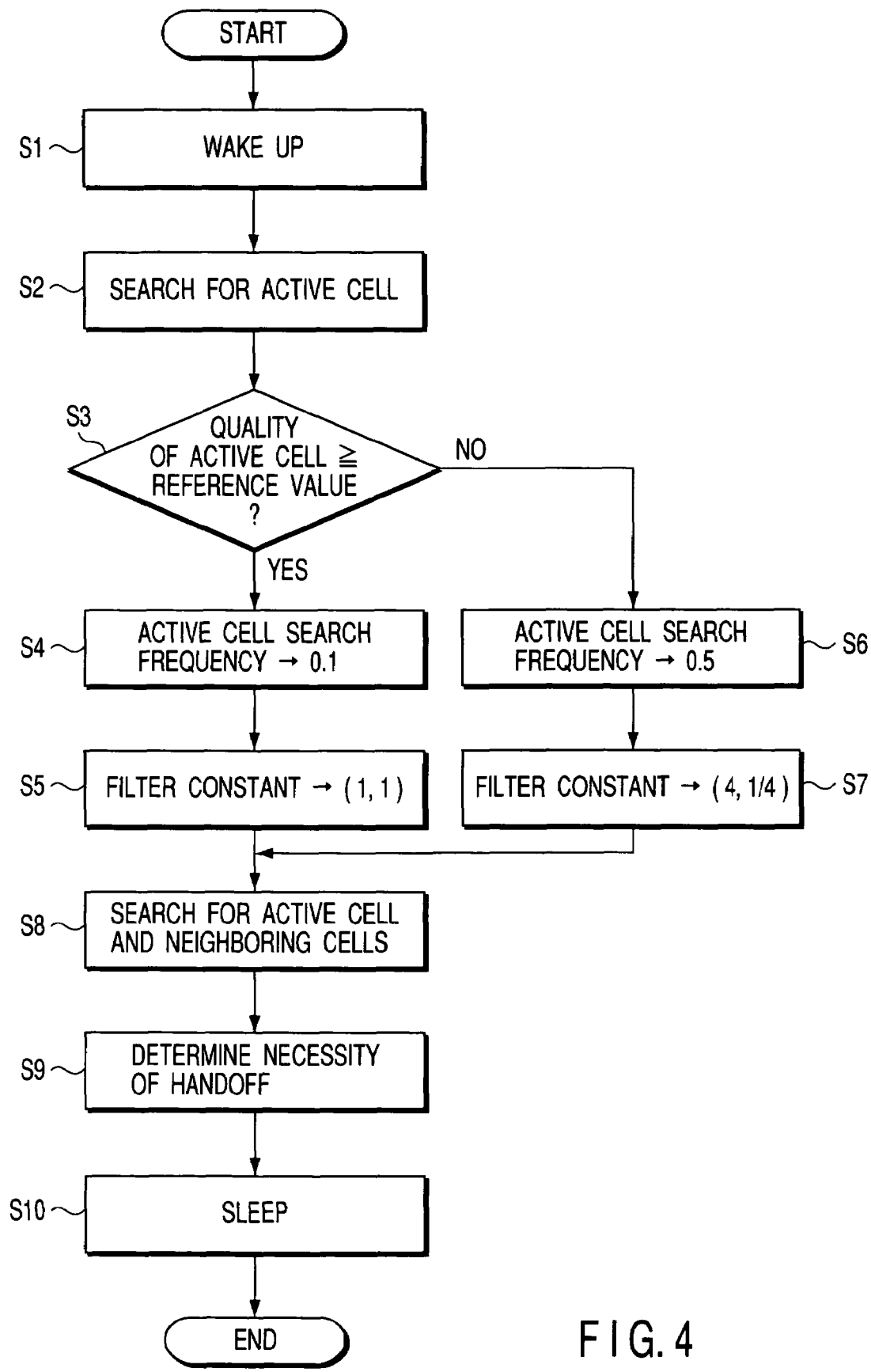
FIG. 4 is a flow chart showing procedures and their contents in determining by the mobile communication terminal shown in FIG. 1 whether handoff is necessary.

A handoff control operation by the mobile communication terminal having the above arrangement will be described next. FIG. 4 is a flow chart showing control procedures and control contents.

The control unit 7 alternately repeats a wakeup period and a sleep period in accordance with a standby cycle (e.g., 1 to 3 sec) called DRX_Cycle defined by the system.

In the wakeup period, the control unit 7 executes wakeup processing in step S1. With this wakeup processing, circuits necessary for the reception operation in the terminal are booted to an operable state. The processing is executed in an order of wakeup of the baseband unit 3, activation of a clock generation circuit (not shown), the start of power supply to the radio unit 2, and initialization of the demodulation circuit in the baseband unit 3.

When the wakeup operation is ended, the baseband unit 3 executes, in step S2, the active cell search operation for identifying the reception timing in the following way.

A pilot signal transmitted from the active base station is received by the receiver 2b through the antenna 1. The reception signal (I/Q digital signal) is input to the cell searcher 4 of the baseband unit 3.

In the cell searcher 4, a spreading code is read out from the cell information storage circuit 12 while setting the phase offset value corresponding to the active base station as the initial phase in accordance with a designation from the handoff controller 6. The search circuit 11 despreads the reception signal output from the receiver 2b by using the readout spreading code. The reception power level of the received pilot signal that is reproduced by the despreading is detected. That is, the correlation value between the received pilot signal and the spreading code is detected. The search controller 13 detects the absolute value of the reception power level of the reception signal immediately before the despreading and calculates the ratio of the absolute value to the correlation value. At this time, the absolute value equals the interference wave power level. Hence, with the above calculation, the ratio (SIR) of the reception power level of the pilot signal transmitted from the active base station to the interference wave power level is obtained.

When the SIR is calculated, the search controller 13 compares the calculated SIR with a preset reference value in step S3. The reference value is set to, e.g., the minimum allowable SIR value. This value corresponds to the minimum value of bit error rate, with which synchronization between the mobile communication terminal and the active base station can stably be held. The frequency of cell search for the active base station in the next and subsequent cycles and the filter constant to be used for quality evaluation are set on the basis of the comparison result.

For example, assume that the comparison result indicates that the calculated SIR is equal to or larger than the reference value. In this case, the search controller 13 determines that the communication quality of the active cell is sufficiently high, and therefore, cell search for the active base station need not be executed frequently. In step S4, the frequency of cell search for the active base station is set to, e.g., "0.1". The handoff controller 6 is notified of the set frequency. The value "0.1" indicates that search for the active base station is executed once for every 10 cycles of search for the neighboring base stations.

In step S5, the search controller 13 sets the filter constant to (1,1) and gives the set filter constant to the cell quality evaluator 14. The value (1,1) represents that register length=1, and weight coefficient=1. In the cell quality evaluator 14, all the switches in the switch circuit 34 are turned off. Weight coefficient=1 is output from the register 33. For this reason, a value obtained by multiplying the SIR obtained in the latest cell search by weight coefficient=1 is sent to the search controller 13 through the adder 35 as a quality evaluation value.

In step S8, at least the next cell search for the active base station is executed once for every 10 cycles of cell search for the neighboring base stations. Determination of the reception quality at this time is executed on the basis of only the SIR obtained by the latest active cell search. For this reason, power consumption by the cell search for the active base station is reduced. Accordingly, the battery service life can be prolonged, and the standby time of the terminal can be prolonged.

On the other hand, assume that the comparison result indicates that the calculated SIR is smaller than the reference value. In this case, the search controller 13 determines that the reception quality from the active base station is not sufficiently high, and therefore, cell search for the active base station needs to be executed frequently. In step S6, the frequency of cell search for the active base station is set to, e.g., "0.5". The handoff controller 6 is notified of the set frequency. The value "0.5" indicates that search for the active base station is executed once for every two cycles of search for the neighboring base stations.

In step S7, the search controller 13 sets the filter constant to (4,¼) and gives the set filter constant to the cell quality evaluator 14. The value (4,¼) represents that register length=4, and weight coefficient=¼. In the cell quality evaluator 14, all the switches in the switch circuit 34 are turned on. Weight coefficient=¼ is output from the register 33. For this reason, the adder 35 adds a value obtained by multiplying the SIR obtained in the latest cell search by weight coefficient=¼ to values obtained by multiplying SIRs obtained in the three past active cell search cycles by weight coefficient=¼. The sum is sent to the search controller 13 as a quality evaluation value. That is, the average value of the SIR obtained in the latest active cell search and each of those obtained in the three past active cell search cycles is calculated. The average value of the SIRs is sent to the search controller 13.

In step S8, at least the next cell search for the active base station is executed once for every two cycles of cell search for the neighboring base stations. Determination of the reception quality at this time is executed in consideration of not only the SIR obtained by the latest active cell search but also the SIRs obtained in the three past active cell search cycles. For this reason, if the reception quality from the active base station degrades, handoff can be executed without delay. In addition, even when the SIR obtained by the latest cell search is influenced by an instantaneous change in transmission path environment, the reception quality and the necessity of handoff can accurately be determined by reducing the influence.

When handoff determination in step S9 is ended, the control unit 7 executes processing for a shift to the sleep period in step S10. The shift processing to the sleep period is executed in an order of stop of power supply to the radio unit 2, setting and storage of the next intermittent wakeup timing, stop of generation of various clocks, and stop of the operation of the baseband unit 3. Then, the mobile communication terminal shifts to a reception idle operation under low power consumption.

As described above, according to this embodiment, when the reception quality of the pilot signal from the active base station is high, the frequency of active cell search is set low. In addition, the reception quality is determined on the basis of the SIR detected by the latest search. With this operation, the power consumed by active cell search can be reduced, and the battery service life can further be prolonged.

On the other hand, when the reception quality of the pilot signal from the active base station is not high, the frequency of active cell search is set high. In addition, the reception quality is determined on the basis of the average value of the SIR obtained by the latest active cell search and each of those obtained in the three past active cell search cycles. For this reason, if the reception quality from the active base station degrades, handoff can be executed without delay. In addition, since the influence of an instantaneous change in transmission path environment can be reduced, the reception quality and the necessity of handoff can accurately be determined. As a result, the power consumption of the terminal can be reduced, and the battery service life can be prolonged.

The present invention is not limited to the above embodiment. For example, in the above embodiment, the reception quality is evaluated in two ranks, i.e., high or low. The frequency of active cell search in the next and subsequent cycles is variably set in two levels in accordance with the evaluation result. However, the reception quality may be evaluated in three or more ranks by using two or more threshold values, and the frequency of active cell search in the next and subsequent cycles may variably be set in three or more levels in accordance with the evaluation result.

The cell quality evaluator 14 may select only the latest reception quality or the average value between the latest reception quality and a past reception quality in accordance with the evaluation result of the reception quality from the active base station. When the latest reception quality is lower than a preset lowest level, the past reception quality may be selected.

In calculating the average value between the latest reception quality and a past reception quality, the latest and past reception qualities may be weighted by different weight coefficients in accordance with the evaluation result of the reception quality, and then, the average value between the weighted latest reception quality and the weighted past reception quality may be calculated. That is, weighting and averaging processing is executed. For example, generally, the latest reception quality often reflects the current situation of the mobile communication terminal more strongly than the past reception quality. For this reason, the weight coefficient to be given to the latest reception quality is set to be larger than that to be given to the past reception quality.

Alternatively, in calculating the average value between the latest reception quality and a past reception quality, the number of past reception qualities to be used for average value calculation may adaptively be changed in accordance with the evaluation result of the reception quality. For example, as the latest reception quality degrades, the number of past reception qualities to be used for average value calculation is increased. In this way, the reliability of the average value of reception qualities when the reception quality is low can further be increased.

When the average value is to be calculated by using a plurality of past reception qualities, a smaller weight coefficient is used for a reception quality of earlier measurement timing. Generally, the longer the elapse time from the measurement timing is, the lower the reliability of the reception quality becomes. When the weight coefficient for the reception quality is changed in accordance with the measurement timing, the decrease in reliability of the reception quality along with the elapse of time can be reflected on the average value.

The number of past reception qualities to be stored is not limited to three. The number may be set to one, two, or four or more. The reception quality may be selected by turning on/off the switch circuit 34 or by individually changing the weight coefficients to be given to the latest and past reception qualities. In this case, when the weight coefficient for a reception quality not to be selected is set to zero, the reception quality can be set as unselected.

In the above embodiment, the SIR of the pilot signal is measured. Instead, the communication quality may be determined on the basis of the reception field strength (RSSI).

The control unit 7 may have the function of the handoff controller 6. Even for the type and arrangement of the mobile communication terminal, the arrangements and processing contents of the cell searcher and cell quality evaluator, and the procedures and contents of handoff control, various changes and modifications can be made without departing from the spirit and scope of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A mobile communication terminal used in a cellular mobile communication system, comprising:
   a module configured to measure, at a first interval between successive searches, a reception quality of a radio signal transmitted from an active base station serving the mobile communication terminal in a standby mode;
   a module configured to evaluate the measured reception quality;
   a module configured to change the first interval between successive searches to a second interval, different from the first interval, on the basis of an evaluation result of the reception quality;
   a module configured to store the measured reception quality; and
   a filtering module configured to execute filtering processing for the measured latest reception quality and a stored past reception quality on the basis of an evaluation result of the reception quality by the evaluation module and input the reception qualities that have undergone the filtering processinq to the evaluation module,
   wherein the reception quality evaluation module determines whether the measured reception quality is in a satisfactory state wherein the reception quality is more than a threshold value,
   when the measured reception quality has changed from a degraded state wherein the reception quality is less than the threshold value to the satisfactory state, the interval change module changes the first interval to the second interval longer than the first interval, and
   wherein the evaluation module determines whether the measured reception guality is in a satisfactory state wherein the reception quality is more than a threshold value, and when the evaluation module evaluates that the reception quality is in the satisfactory state wherein the reception quality is more than the threshold value, the filtering module selects the measured latest reception quality and inputs the latest reception quality to the evaluation module, and when the evaluation module evaluates that the reception quality is in a degraded state wherein the reception guality is less than the threshold value, the filtering module selects both the measured latest reception quality and the stored past reception quality, calculates a reception quality, and inputs the calculated reception guality to the evaluation module.

2. A terminal according to claim 1, wherein the filtering module weights the selected latest and past reception qualities by using different weight coefficients and calculates the reception quality based on the weighted reception qualities.

3. A terminal according to claim 1, wherein when the evaluation module evaluates that the reception quality is in the degraded state wherein the reception quality is less than the threshold value, the filtering module adaptively changes the number of past reception qualities to be used for the calculation of the reception quality in accordance with a level of degradation.

4. A terminal according to claim 1, wherein when the evaluation module evaluates that the reception quality is in the degraded state wherein the reception quality is less than the threshold value, the filtering module selects a plurality of past reception qualities to be used for the calculation of the reception quality and weights the plurality of selected past reception qualities by using weight coefficients which become larger as a measurement timing becomes later.

5. A terminal according to claim 1, wherein the filtering module executes the filtering processing for the latest and past reception qualities by selection by a switch.

6. A terminal according to claim 1, wherein the filtering module executes the filtering processing for the latest and past reception qualities by changing a weight coefficient to be given to the reception quality.

7. The terminal according to claim 1, wherein the interval changing module has a function of changing an interval rate of cell search for the active base station in which synchronization has been established with the mobile communication terminal, and for neighboring base stations located around the active base station.

8. A cell search circuit used in a mobile communication terminal, comprising:
   a module configured to measure, at a first interval between successive searches, a reception quality of a radio signal transmitted from an active base station serving the mobile communication terminal in a standby mode;
   a module configured to evaluate the measured reception quality;
   a module configured to change the first interval between successive searches to a second interval, different from the first interval, on the basis of an evaluation result of the reception quality;
   a module configured to store the measured reception quality; and
   a filtering module configured to execute filtering processing for measured latest reception quality and a stored past reception quality on the basis of an evaluation result of the reception quality by the evaluation module and input the reception qualities that have underqone the filtering processing to the evaluation module,
   wherein the reception quality evaluation module determines whether the measured reception quality is in a satisfactory state wherein the reception quality is more than a threshold value,
   when the measured reception quality has changed from a degraded state wherein the reception quality is less than the threshold value to the satisfactory state, the interval change module changes the first interval to the second interval longer than the first interval, and
   wherein the evaluation module determines whether the measured reception quality is in a satisfactory state wherein the reception quality is more than a threshold value, and when the evaluation module evaluates that the reception quality is in the satisfactory state wherein the reception quality is more than the threshold value, the filtering module selects the measured latest reception quality and inputs the latest reception quality to the evaluation module, and when the evaluation module evaluates that the reception quality is in a degraded state wherein the reception quality is less than the threshold value, the filtering module selects both the measured latest reception quality and the stored past reception quality, calculates a reception quality, and inputs the calculated reception quality to the evaluation module.

9. A mobile communication terminal used in a cellular mobile communication system, comprising:
   a module configured to measure, at a first interval between successive searches, a reception quality of a radio signal transmitted from an active base station serving the mobile communication terminal in a standby mode;
   a module configured to evaluate the measured reception quality; and
   a module configured to change the first interval between successive searches to a second interval, different from the first interval, on the basis of an evaluation result of the reception quality,
   wherein the reception quality evaluation module determines whether the measured reception quality is in a satisfactory state wherein the reception quality is more than a threshold value,
   when the measured reception quality has changed from the satisfactory state wherein the reception quality is more than the threshold value to a degraded state, the interval change module changes the first interval to the second interval shorter than the first interval, and
   wherein the first interval and the second interval are based on a ratio of number of cell search cycles for the active base station to a number of cell search cycles for neighboring base stations.

10. A cell search circuit used in a mobile communication terminal, comprising:
   a module configured to measure, at a first interval between successive searches, a reception quality of a radio signal transmitted from an active base station serving the mobile communication terminal in a standby mode;
   a module configured to evaluate the measured reception quality; and
   a module configured to change the first interval between successive searches to a second interval, different from the first interval, on the basis of an evaluation result of the reception quality,
   wherein the reception quality evaluation module determines whether the measured reception quality is in a satisfactory state wherein the reception quality is more than a threshold value,
   when the measured reception quality has changed from the satisfactory state wherein the reception quality is more than the threshold value to a degraded state, the interval change module changes the first interval to the second interval shorter than the first interval, and
   wherein the first interval and the second interval are based on a ratio of number of cell search cycles for the active base station to a number of cell search cycles for neighboring base stations.

* * * * *